United States Patent
Yamazaki et al.

(10) Patent No.: US 6,531,215 B2
(45) Date of Patent: Mar. 11, 2003

(54) ARTICLE WITH ANTIFOGGING FILM AND PROCESS FOR PRODUCING SAME

(75) Inventors: Seiji Yamazaki, Mie (JP); Noboru Murata, Mie (JP); Hideki Yamamoto, Mie (JP)

(73) Assignee: Central Glass Company, Limited, Ube (JP)

(*) Notice: Subject to any disclaimer, the term of this patent is extended or adjusted under 35 U.S.C. 154(b) by 45 days.

(21) Appl. No.: 09/835,847

(22) Filed: Apr. 17, 2001

(65) Prior Publication Data

US 2002/0037402 A1 Mar. 28, 2002

Related U.S. Application Data

(63) Continuation-in-part of application No. 09/714,769, filed on Nov. 17, 2000.

(30) Foreign Application Priority Data

| Nov. 19, 1999 | (JP) | 11-329527 |
| Nov. 26, 1999 | (JP) | 11-335334 |
| Apr. 17, 2000 | (JP) | 2000-114517 |

(51) Int. Cl.⁷ .............. B32B 17/10; B60J 1/00; B05D 5/04
(52) U.S. Cl. .............. 428/336; 427/163.4; 427/164; 427/165; 427/407.2; 428/436; 428/437; 428/442; 428/447; 428/448; 428/451; 428/522; 428/524; 428/912.2
(58) Field of Search .............. 427/163.4, 164, 427/165, 407.2; 428/336, 436, 437, 442, 447, 448, 451, 522, 524, 912.2

(56) References Cited

U.S. PATENT DOCUMENTS

| 5,853,866 A | 12/1998 | Watanabe | 428/312.8 |
| 6,027,797 A | 2/2000 | Watanabe | 428/312.8 |

FOREIGN PATENT DOCUMENTS

| JP | 52101680 | 8/1977 |
| JP | 1038103 | 2/1989 |
| JP | 5051471 | 3/1993 |
| JP | 5253544 | 10/1993 |
| JP | 6157794 | 6/1994 |
| JP | 6158031 | 6/1994 |
| JP | 7232080 | 9/1995 |
| JP | 9059042 | 3/1997 |
| JP | 9136374 | 5/1997 |
| JP | 10212471 | 8/1998 |
| JP | 11084102 | 3/1999 |

*Primary Examiner*—D. S. Nakarani
(74) *Attorney, Agent, or Firm*—Crowell & Moring LLP

(57) ABSTRACT

An antifogging article includes a substrate and an antifogging film covering the substrate. This antifogging film contains a water-absorbing organic polymer and an inorganic substance and has a water repellent finishing on a surface of the antifogging film. Another antifogging article includes (1) a substrate, (2) a water-absorbing, antifogging film covering the substrate, and (3) a water-permeable, protective film covering the antifogging film. This antifogging film contains (a) a polyvinyl acetal resin having a degree of acetalization of not greater than 10 mol % and (b) a hydrolysate or partial hydrolysate of an alkylsilylisocyanate. This constituent (b) can be replaced with at least one of a silylisocyanate, its hydrolysate, and its partial condensate. These antifogging articles are superior in antifogging property and abrasion resistance.

12 Claims, No Drawings

ARTICLE WITH ANTIFOGGING FILM AND PROCESS FOR PRODUCING SAME

BACKGROUND OF THE INVENTION

The present invention relates to an article with an antifogging film, which is useful for windows, mirrors and the like in various fields such as architectural, industrial and automotive ones, and a process for producing the article.

In recent years, there have been proposals of forming photocatalytic films on the substrate surface for providing hydrophilicity and antifogging property.

Japanese Patent Laid-open Publication JP-A-5-253544 discloses a process for producing a plate-like member with deodorizing function by applying a glaze to a substrate and then by spraying an anatase-type $TiO_2$ powder to the glaze layer.

JP-A-7-232080, which-corresponds to U.S. Pat. Nos. 6,027,797 and 5,853,866, discloses a multifunctional material with photocatalytic function, prepared by forming a binder layer on a substrate and then by forming a photocatalytic layer of photocatalytic particles on the binder layer.

JP-A-9-59042 discloses a transparent substrate with an antifogging coating containing photocatalytic titania particles.

JP-A-52-101680 discloses an antifogging agent containing polyacrylic acid, surfactant and a solvent (water and/or alcohol).

Japanese Patent Examined Publication JP-B-5-67330, which corresponds to JP-A-1-38103, discloses a hydrophilic porous film and a process for producing the same. This film is made of a hydrophobic polymer. The external surface and the pore surfaces of the film are coated with a coating of a polyvinyl alcohol/vinyl acetate copolymer and then with a coating of a hydrophilic polymer.

JP-A-10-212471 discloses an antifogging agent containing polyvinyl alcohol, tetramethoxysilane, and hydrochloric acid as a catalyst for polycondensation of these compounds.

JP-A-11-84102 discloses an antifogging coating film and an optical article with this film. This antifogging coating film has (1) a water-absorbing film formed on a substrate and (2) a porous film formed on the water-absorbing film.

JP-A-5-51471 discloses a laminate prepared by forming a curable coating film on a substrate. At least a surface layer portion of the substrate is made of a polymer having —P=N—skeleton.

JP-A-6-157794 discloses an antifogging agent containing a polyvinyl acetal resin.

JP-A-6-158031 discloses a first antifogging article prepared by forming on a substrate an antifogging layer of a polyvinyl acetal resin having-a degree of acetalization of 2–40 mol %. This publication further discloses a second antifogging article prepared by forming a water-soluble resin layer on a substrate and then the antifogging layer.

JP-A-9-136374 discloses an antifogging resin article prepared by forming on a resin substrate a first layer containing hydrophilic inorganic fine particles and a coupling agent and then by forming on the first layer a second layer made of a hydrophilic resin and/or a surfactant.

SUMMARY OF THE INVENTION

It is an object of the present invention to provide an antifogging article which is superior in antifogging property and abrasion resistance.

It is another object of the present invention to provide a process for producing such antifogging article.

According to a first aspect of the present invention, there is provided a first antifogging article comprising a substrate; and an antifogging film covering said substrate. This antifogging film comprises a water-absorbing organic polymer and an inorganic substance and has a water repellent finishing on a surface of said antifogging film.

According to the first aspect of the present invention, there is provided a first process for producing an antifogging article, comprising:

preparing a first coating solution by dissolving a water-absorbing organic polymer and a silicon-containing compound in a solvent;

applying said first coating solution to a substrate, thereby forming thereon a first precursory film;

drying said first precursory film into an antifogging film;

applying a second coating solution to said antifogging film, thereby forming a second precursory film on said antifogging film; and drying said second precursory film into a water repellent film.

According to a second aspect of the present invention, there is provided a second antifogging article comprising:

a substrate;

a water-absorbing, antifogging film covering said substrate, said antifogging film comprising:

(a) a polyvinyl acetal resin having a degree of acetalization of not greater than 10 mol %; and (b) a hydrolysate or partial hydrolysate of an alkylsilylisocyanate represented by the general formula $R^2_n SiR^1_{4-n}$ where $R^1$ is an alkyl group having a carbon atom number of 1 or 2, $R^2$ is an isocyanate group, and n is 1 or 2; and a water-permeable, protective film covering said antifogging film.

According to the second aspect of the present invention, there is provided a second process for producing an antifogging article, comprising:

(a) providing a substrate;

(b) preparing a first coating liquid by adding a polyvinyl acetal resin and an alkylsilylisocyanate to a solvent, said polyvinyl acetal resin having a degree of acetalization of not greater than 10 mol %, said alkylsilylisocyanate being represented by the general formula $R^2_n SiR^1_{4-n}$ where $R^1$ is an alkyl group having a carbon atom number of 1 or 2, $R^2$ is an isocyanate group, and n is 1 or 2;

(c) applying said first coating liquid to said substrate, thereby forming a first precursory film on said substrate;

(d) drying said first precursory film into a waterabsorbing, antifogging film;

(e) applying a second coating liquid containing an alkylsilylisocyanate to said antifogging film, said alkylsilylisocyanate being represented by the general formula $R^2_n SiR^1_{4-n}$ where $R^1$ is an alkyl group having a carbon atom number of 1 or 2, $R^2$ is an isocyanate group, and n is 1 or 2, thereby forming a second precursory film on said antifogging film; and (f) drying said second precursory film into a waterpermeable, protective film.

According to a third aspect of the present invention, there is provided a third antifogging article comprising:

a substrate;

a water-absorbing, antifogging film covering said substrate, said antifogging film comprising:

(a) a polyvinyl acetal resin having a degree of acetalization of not greater than 10 mol %; and (b) a constituent that is at least one of a silylisocyanate, a hydrolysate of said silylisocyanate, and a partial condensate of said silylisocyanate, said silylisocyanate being represented by the formula $Si(NCO)_4$; and a water-permeable, protective film covering said antifogging film.

According to the third aspect of the present invention, there is provided a third process for producing an antifogging article, comprising:

(a) providing a substrate;

(b) preparing a first coating liquid by adding a polyvinyl acetal resin and a constituent to a solvent, said polyvinyl acetal resin having a degree of acetalization of not greater than 10 mol %, said constituent being at least one of a silylisocyanate, a hydrolysate of said silylisocyanate, and a partial condensate of said silylisocyanate, said silylisocyanate being represented by the formula $Si(NCO)_4$;

(c) applying said first coating liquid to said substrate, thereby forming a first precursory film on said substrate;

(d) drying said first precursory film into a water-absorbing, antifogging film;

(e) applying a second coating liquid containing a water-repellent silicon compound to said antifogging film, thereby forming a second precursory film on said antifogging film; and (f) drying said second precursory film into a water-permeable, protective film.

The first, second and third antifogging articles can respectively be produced by the first, second and third processes.

DESCRIPTION OF THE PREFERRED EMBODIMENTS

The above-mentioned first antifogging article of the invention is superior for a long time in antifogging property, durability (particularly abrasion resistance) and transparency, has no image distortion, no defects such as cracks, nor damage to the color tone of its substrate. The first antifogging article can efficiently be produced by the first process with a low production cost and a high productivity. The first antifogging article can be used for various indoor and outdoor glass articles such as architectural window panes, bathroom mirrors, and automotive door mirror and window panes.

The antifogging film of the first antifogging article is superior in antifogging property due to the inclusion of a water-absorbing organic polymer therein. When water drops fall on the antifogging film, they are absorbed by this film until the maximum of the water-absorbing capacity of the organic polymer. With this, it is possible to maintain the antifogging property of this film. Furthermore, even if it exceeds the maximum of the water-absorbing capacity, a uniform water film can be formed on the antifogging film. With this, it is also possible to maintain the antifogging property of the film. However, a film made of only a water-absorbing organic polymer not according to the invention is inferior in water resistance and mechanical strength and can not be expected to have a superior chemical durability. In contrast, according to the first aspect of the present invention, the antifogging film contains an inorganic substance (amorphous silica) in addition to a water-absorbing organic polymer. With this, the antifogging film is unexpectedly substantially improved in water resistance, chemical durability and adhesion to the substrate. Furthermore, according to the first aspect of the invention, it is preferable that the antifogging film is coated with a water repellent film as a protective film. With this, the surface of the antifogging article is lowered in free energy (i.e., considerably lowered in coefficient of kinetic friction). Therefore, it becomes possible to considerably improve the antifogging article in abrasion resistance. Furthermore, it is preferable that the water repellent film has an ultra-thin thickness of not greater than 10 nm and a porous or incompact structure. This structure can be obtained by drying the second precursory film at a second temperature of 70–120° C. in the first process. In other words, the water repellent film can be a porous, monomolecular film. Thus, the water repellent film can provide air permeability and water permeability through pores of this film. Therefore, even if the antifogging film is coated with the water repellent film, the antifogging film is not impaired in water absorption or adsorption thereby and in water release or desorption therefrom. Thus, the antifogging article can be superior in antifogging property for a long time.

As stated above, the first antifogging article can be produced by the first process. In this process, the first precursory film is dried into an antifogging film having a so-called composite or inhomogeneous structure where an amorphous silica, derived from the silicon-containing compound of the first coating solution, exists as a matrix in a manner to surround the water-absorbing polymer. With this composite structure, the antifogging film is improved in mechanical strength, chemical durability, water resistance and the like.

In the antifogging film of the first antifogging article, the organic polymer and the silica (inorganic substance) are respectively preferably in amounts of 95–99.5 wt % and 0.5–5.0 wt %, based on the weight of the antifogging film. If the silica content is less than 0.5 wt %, the antifogging film may be insufficient in water resistance and chemical durability. If the silica content exceeds 5.0 wt %, the antifogging film may become inferior in water absorption and antifogging property. The silica content is more preferably from 1.0 to 2.5 wt %. The antifogging film may contain titania, zirconia, alumina and the like, in addition to the silica.

The antifogging film of the first antifogging article has a thickness of preferably 2–10 μm, more preferably 5–7 μm. If it is less than 2 μm, the film may become insufficient in water absorption capability. If it is greater than 10 μm, the film may become inferior in water or air permeability. With this, the rate of water release from the antifogging film may become too slow. Furthermore, the antifogging film may have an opaqueness (white color) with a thickness greater than 10 μm.

As stated above, the antifogging film of the first antifogging article has a water repellent finishing on its surface. This finishing is preferably a water repellent film, but is not limited to the same. It is preferable that the water repellent film has a thickness of not greater than 10 nm. If it is greater than 10 nm, it may become difficult to have a sufficient water adsorption and desorption through the water repellent film. With this, the antifogging article may become inferior in antifogging property.

In the first process, examples of the organic polymer of the first antifogging article are hydroxypropyl cellulose, polyvinyl alcohol, polyvinyl acetal, polyvinyl pyrrolidone, and polyvinyl acetate. Examples of the silicon-containing compound for providing the silica in the antifogging film are tetraethoxysilane, tetramethoxysilane, monomethyltriethoxysilane, monomethyltrimethoxysilane, dimethyldimethoxysilane, and dimethyldiethoxysilane. It is optional to add at least one compound selected from aluminum alkoxides, titanium alkoxides, zirconium alkoxides, aluminum acetylacetonates, titanium acetylacetonates, zirconium acetylacetonates, and zirconium chloride, to the first coating solution, in order to make the antifogging film contain at least one of alumina, titania and zirconia.

In the first process, the raw material of the water repellent film is not particularly limited. Its preferable examples are methylsilicon triisocyanate, dimethylsilicon diisocyanate, trimethylsilicon isocyanate, and fluoroalkyltrimethoxysilanes.

In the first process, the total solid matter concentration of each of the first and second coating solutions may be adjusted to about 1 to about 5 wt %. The viscosity of the first and second coating solution may be adjusted to about 0.002 to 0.01 N·s/m².

In the first process, the first precursory film is dried at a temperature of preferably about 90–150° C., more preferably about 110–130° C., for a period of time of preferably about 10–30 minutes, more preferably about 15–20 minutes. The second precursory film is dried at a temperature of preferably about 70–120° C., more preferably about 100–110° C., for a period of time of preferably about 5–30 minutes, more preferably about 15–20 minutes. If these drying temperatures are lower than the respective preferable lowest temperatures, the evaporation of the solvent may become insufficient. Thus, the antifogging film and the water repellent film may become insufficient in water resistance, mechanical strength and/or chemical durability. Drying temperatures higher than the respective preferable highest temperatures do not cause particular disadvantages nor particular advantages, as compared with the above-mentioned ranges.

The second antifogging article is superior for a long time in antifogging property, wiping resistance and abrasion resistance, particularly when the antifogging film is coated with a water-permeable, protective film having a thickness of 3–10 nm. Similarly, the third antifogging article is superior for a long time in antifogging property, wiping resistance and abrasion resistance, particularly when the antifogging film is coated with a water-permeable, protective film having water repellency and a thickness of 10 nm or less (e.g., 3–10 nm). The antifogging film of the second antifogging article is superior in strength, since a cross-linking can be formed by a reaction between hydroxyl group of the polyvinyl acetal resin and the isocyanate group of the alkylsilylisocyanate. Similarly, the antifogging film of the third antifogging article is superior in strength, since a cross-linking can be formed by a reaction between hydroxyl group of the polyvinyl acetal resin and the isocyanate group of the silylisocyanate. Similar to the first antifogging article, the second and third antifogging articles can also widely be used for automobiles and mirrors. Furthermore, the first, second and third antifogging articles can respectively be produced by the first, second and third processes at relatively low drying temperatures. Therefore, it is possible to partially or entirely coat a substrate, to which a high temperature drying is not desirable, such as a glass plate already formed into a mirror or an automotive glass pane already bent and shaped, thereby producing the first, second or third antifogging article.

As stated above, the antifogging film of the second or third antifogging article contains a first essential constituent, a polyvinyl acetal resin having a degree of acetalization of not greater than 10 mol %. With this, the antifogging film becomes superior in antifogging property and transparency. If its degree of acetalization is greater than 10 mol %, the resulting antifogging film may become inferior in antifogging property.

According to the second antifogging article, a second essential constituent of the antifogging film is a hydrolysate or partial hydrolysate of an alkylsilylisocyanate represented by the general formula $R^2_n SiR^1_{4-n}$ where $R^1$ is an alkyl group having a carbon atom number of 1 or 2, $R^2$ is an isocyanate group, and n is 1 or 2. The amount of the second constituent in the antifogging film is preferably of 1–5 wt %, based on the total weight of the first and second constituents. If it is less than 1 wt %, the antifogging film may become inferior in strength and wiping resistance. If it is greater than 5 wt %, the antifogging film may become inferior in antifogging property.

According to the third antifogging article, a second essential constituent of the antifogging film is at least one of a silylisocyanate represented by the formula $Si(NCO)_4$, a hydrolysate of the silylisocyanate, and a partial condensate of the silylisocyanate. The amount of the second constituent in the antifogging film is preferably of 0.5–5.0 wt %, based on the total weight of the first and second constituents. If it is less than 0.5 wt %, the antifogging film may become inferior in strength and wiping resistance. If it is greater than 5.0 wt %, the antifogging film may become inferior in antifogging property. Furthermore, the first coating liquid may become unstable.

In the first, second and third processes, the solvent for preparing the first coating solution (liquid) is preferably a mixture of water and at least one compound selected from (1) alcohols (particularly lower alcohols) such as methanol, ethanol, propanol, ethylene glycol, propylene glycol and hexylene glycol, (2) esters such as ethyl acetate, butyl acetate and amyl acetate, and (3) cellosolves such as methyl cellosolve, ethyl cellosolve and butyl cellosolve. Of these, it is preferable to select a suitable one or mixture of at least two, in view of the evaporation rate of the first coating solution (liquid) and/or viscosity of the first precursory film. Furthermore, it is optional to add suitable amounts of a silane coupling agent (e.g., methacryloxypropyltrimethoxysilane) and a methyl silicone (e.g., dimethyl silicone) as a leveling agent.

In the first, second and third processes, the manner of applying the first or second coating solution (liquid) is not particularly limited. For example, it can be selected from spin coating, dip coating, reverse coating, flexography, roller coating, curtain coating, nozzle coating, spraying and screen printing.

In the second and third processes, the first precursory film is dried at a temperature of preferably 90–150° C. for a period of time of preferably 30–60 minutes. With this, most of the solvent evaporates, and at the same time the second essential constituent (i.e., the hydrolysate or partial hydrolysate of the alkylsilylisocyanate in the second process and at least one of the silylisocyanate, its hydrolysate and its partial condensate in the third process) becomes a matrix of the antifogging film. The antifogging film of the second antifogging article has a thickness of preferably about 3–10 μm. If it is less than 3 μm, the antifogging film may become inferior in antifogging durability. If it is greater than 10 μm, the antifogging article may have an optical distortion in connection with the external appearance. The antifogging film of the third antifogging article has a thickness preferably of 3 μm or greater, more preferably 3–60 μm, still more preferably 10–30 μm. If it is less than 3 μm, the antifogging film may become inferior in antifogging durability.

In the second process, it is possible to use an alkylsilylisocyanate represented by $R^2_n SiR^1_{4-n}$ where $R^1$, $R^2$ and n are defined as above, for preparing the water-permeable, protective film. In this film, the alkylsilylisocyanate can be in the form of its hydrolysate or partial hydrolysate. In the preparation of the second coating liquid, the alkylsilylisocyanate can be added to a solvent (e.g., ester or hydrocarbon). Furthermore, it is optional to add a leveling agent. The second precursory film can be dried at a relatively low temperature of 90–120° C. for a period of time of 10–60 minutes. With this, most of the solvent may evaporate, and at the same time the hydrolysate or partial hydrolysate of the alkylsilylisocyanate may turn into a hardened film. The second antifogging article is improved in scratch resistance and wiping resistance due to the use of the water-permeable, protective film.

The water-permeable, protective film of the second antifogging article has a thickness of preferably 3–10 nm in order to have a sufficient water permeability. If it is less than 3 nm, the antifogging article may become inferior in abrasion resistance and wiping resistance. If it is greater than 10 nm, water permeability of the film may become inferior. With this, the antifogging article may become inferior in antifogging property.

In the third process, it is preferable to use a water-repellent silane compound for preparing the protective film in order to improve the protective film in abrasion resistance and wiping resistance. This silane compound is not particularly limited. Examples of such silane compound include alkylchlorosilanes represented by the formula $(CH_3)_n SiCl_{4-n}$ where n is 1 or 2, alkylalkoxysilanes represented by the general formula $(CH_3)_n SiR_{4-n}$ where n is 1 or 2 and R is a $C_1$–$C_5$ alkoxy group, fluoroalkylsilanes represented by the general formula $CF_3(CF_2)_n CH_2 CH_2 SiX_3$ where n is an integer of 0–9, X is a chloro group or a $C_1$–$C_5$ alkoxy group, methylhydrogensilanes represented by the general formula $CH_3 HSiX_2$ where X is a chloro group or a $C_1$–$C_5$ alkoxy group, hexamethyldisilazanes represented by the formula $(CH_3)_3 SiNHSi(CH_3)_3$, and alkylsilylisocyanates represented by the formula $(CH_3)_n Si(CNO)_{4-n}$ where n is 1 or 2. It is optional to use a mixture of at least two of these. These examples may be in the form of their hydrolysates or their partial condensates.

In the third process, it is preferable to add a curing catalyst to the water-repellent silane compound in order to accelerate the curing at a low temperature at which the silane compound does not become inferior in water absorption capability. The curing catalyst can be selected from chelate agents, acids and metal salts. Examples of the chelate agent are aluminum chelate compounds such as aluminum ethylacetateisopropirate, aluminum tris(ethylacetoacetate), aluminum tris(acetylacetonate), and aluminum bis(ethylacetoacetate)monoacetylacetonate; and titanium chelate compounds such as diisopropoxybis(acetylacetonato)titanium and isopropoxy(2-ethylhexanediorato)titanium. Examples of the acid are inorganic acids such as nitric acid and hydrochloric acid; and organic acids such as acetic acid, maleic acid and citric acid. Examples of the metal salts are sodium acetate, sodium aluminate, sodium zirconate, and cobalt naphthenate. It is optional to use a mixture of at least two curing agents.

In the third process, the raw material(s) of the protective film can be added to a solvent (e.g., water, alcohol, ester or hydrocarbon). Furthermore, it is optional to add a leveling agent. The second precursory film can be dried at a relatively low temperature of 90–150° C. for a period of time of about 10–60 minutes. With this, most of the solvent may evaporate, and at the same time a hardened film is formed.

The water-permeable, protective film of the third antifogging article has a thickness of preferably 3–10 nm in order to have a sufficient water permeability. If it is greater than 10 nm, water permeability of the film may become inferior. With this, the antifogging article may become inferior in antifogging property.

In the first, second and third processes, the substrate is not limited to particular materials. It may be selected from glass, resin, metal and ceramic, as long as it does not deteriorate by the dryings. It is typically a glass plate, which can be selected from float glass plates for automotive, architectural and industrial uses, clear and various color glass plates of green, bronze and other colors, various functional glass plates, tempered glass plates, laminated glass plates, double-layered glass plates, and flat and bent glass plates. The glass plate may have a thickness of about 1.0–12 mm. In fact, it is preferably about 3.0–10 mm for architectural use and about 2.0–5.0 mm for automotive use.

The following nonlimitative examples are illustrative of the present invention. In fact, Examples 1-1 to 1-10 are illustrative of the first aspect of the present invention, Examples 2-1 to 2-4 are illustrative of the second aspect of the present invention, and Examples 3-1 to 3-5 are illustrative of the third aspect of the present invention.

EXAMPLE 1-1

At first, 99.5 wt % of a polyvinyl acetal, KX-1 (trade name) of Sekisui Chemical Co., and 0.5 wt % (in terms of $SiO_2$) of silicon tetraethoxide of Kishida Chemical Co. were added to a solvent (i.e., a mixture of 1 part by weight of EKINEN F-1 (trade name) and 1 part by weight of water). Then, the resulting mixture was stirred at room temperature, thereby obtaining a first coating solution (solid matter concentration: 3 wt %).

Separately, methyl triisocyanato, SIC-003 (trade name) of Matsumoto Seiyaku Co., was added to ethyl acetate of Kishida Chemical Co., thereby obtaining a second coating solution (solid matter concentration: 1 wt %).

Separately, a soda-lime glass plate (widths: 10 cm; thickness: 2 mm) was sufficiently ground with cerium oxide, then washed with clean water, then rinsed with ion-exchanged water, then dried to remove water, and then wiped with isopropyl alcohol, thereby preparing a substrate.

Then, the first coating solution was applied to the substrate by dipping. Then, the coated substrate was dried at 120° C. for 20 minutes, followed by cooling to room temperature, thereby forming a water-absorbing first film on the substrate. The obtained first film was found to be neutral in color tone with respect to the reflection light and the transmitted light and to have a thickness of 5 μm by the measurement with a surface roughness meter, DEKTAK 3030 (trade name) of SLOAN Co. Then, the second coating solution was applied to the first film by spin coating at a spin rate of 1,000 rpm for 30 seconds, followed by drying at 120° C. for 20 minutes, thereby forming a water-repellent, protective, second film on the first film. The thickness of the second film was found to be not greater than 10 nm by the same measurement as above.

EXAMPLE 1-2

Example 1-1 was repeated except that the drying temperature for obtaining the first film was 90° C. and that the drying temperature for obtaining the second film was 70° C. The thickness of the first film was 10 µm.

EXAMPLE 1-3

Example 1-1 was repeated except that the drying temperature for obtaining the first film was 150° C. The thickness of the first film was 3.2 µm.

EXAMPLE 1-4

Example 1-1 was repeated except that the amounts of the polyvinyl acetal and silicon tetraethoxide were respectively 95 wt % and 5 wt %. The thickness of the first film was 5.3 µm.

EXAMPLE 1-5

Example 1-1 was repeated except that hydroxypropyl cellulose (M-type) of Nippon Soda Co. was used in place of the polyvinyl acetal. The thickness of the first film was 3.8 µm.

EXAMPLE 1-6

Example 1-1 was repeated except that 95 wt % of hydroxypropyl cellulose (H-type) of Nippon Soda Co. and 5 wt % of silicon tetraethoxide were added to the solvent in the preparation of the first coating solution. The thickness of the first film was 7.4 µm.

EXAMPLE 1-7

Example 1-1 was repeated except that a polyvinyl alcohol (degree of polymerization: 1,400) of Kishida Chemical Co. was used in place of the polyvinyl acetal. The thickness of the first film was 4.6 µm.

EXAMPLE 1-8

Example 1-1 was repeated except that a polyvinyl alcohol (degree of polymerization: 2,000) of Kishida Chemical Co. was used in place of the polyvinyl acetal. The thickness of the first film was 7.1 µm.

EXAMPLE 1-9

Example 1-1 was repeated except the following. In terms of solid matter weight, 1 part by weight of the polyvinyl acetal and 1 part by weight of a hydroxypropyl cellulose (viscosity: 150–400 cP) of Nippon Soda Co. were mixed together to prepare a polymer mixture. Then, 95 wt % of the polymer mixture and 5 wt % of the silicon tetraethoxide were added to the solvent in the preparation of the first coating solution. The thickness of the first film was 6 µm.

EXAMPLE 1-10

Example 1-1 was repeated except the following. In terms of solid matter weight, 1 part by weight of the polyvinyl acetal and 1 part by weight of a polyvinylpyrrolidone (K-15) of Kishida Chemical Co. were mixed together to prepare a polymer mixture. Then, 95 wt % of the polymer mixture and 5 wt % of the silicon tetraethoxide were added to the solvent in the preparation of the first coating solution. The thickness of the first film was 4.7 µm.

COMPARATIVE EXAMPLE 1-1

Example 1-1 was repeated except the following. Only the polyvinyl acetal was added to the solvent to prepare a first coating solution (solid matter concentration: 4 wt %). The first coating solution was applied to the substrate by spin coating. The thickness of the first film was 4.8 µm. The formation of the second film was omitted. The first film exfoliated from the substrate after each of the after-mentioned abrasion resistance test, water resistance test, wiping resistance test and acid resistance test (see Table 1).

COMPARATIVE EXAMPLE 1-2

Example 1-1 was repeated except that the formation of the second film was omitted. The thickness of the first film was 6.6 µm.

COMPARATIVE EXAMPLE 1-3

Example 1-1 was repeated except that a hydrolysate of silicon tetraethoxide of Kishida Chemical Co., having no water-repellency after drying, was used in place of the methyltriisocyanato in the preparation of the second coating solution. The first and second films were respectively 6 µm and not greater than 10 nm in thickness.

COMPARATIVE EXAMPLE 1-4

Example 1-1 was repeated except the following. Only the polyvinyl acetal was added to the solvent to prepare a first coating solution (solid matter concentration: 4 wt %). The first coating solution was applied to the substrate by spin coating. The first and second films were respectively 6 µm and not greater than 10 nm in thickness. The first and/or second film exfoliated from the substrate after each of the after-mentioned abrasion resistance test, water resistance test, wiping resistance test and acid resistance test (see Table 1).

FIRST EVALUATION TEST

The resulting test samples (the coated substrates) of Examples 1-1 to 1-10 and Comparative Examples 1-1 to 1-4 were subjected to the following evaluation tests.

No fogging was observed by blowing breath against each test sample of Examples 1-1 to 1-10 and Comparative Examples 1-1, 1-2 and 1-4. In contrast, fogging was observed by blowing breath against the test sample of Comparative Example 1-3.

A first antifogging test was conducted in accordance with Japanese Industrial Standard (JIS) S 4030 as follows. In this test, a first step was conducted by retaining the test sample in water vapor of warm water of 43° C. for 3 minutes, and then a second step was conducted by moving the test sample from the water vapor to an environment (temperature: 23° C.; relative humidity: 63%) and then by blowing breath against the test sample, thereby completing one cycle. The first and second steps were conducted alternately to complete ten cycles. The test sample was judged to be satisfactory when the external appearance did not change after each first step and each second step, as shown by "Good" in the column of "external appearance" of Table 1. On the other hand, it was judged to be unsatisfactory when the external appearance changed, as shown by "Not Good" in the column of "external appearance" of Table 1. Furthermore, the test sample was judged to be satisfactory when no fogging was observed on the test sample even by blowing breath against the test sample after each first step and each second step, as shown by "Good" in the column of "fogging" of Table 1. On the other hand, it was judged to be unsatisfactory when fogging was observed, as shown by "Not Good" in the column of "fogging" of Table 1.

A second antifogging test was conducted by a first step of allowing the test sample to stand still in a refrigerator of 4° C. for 30 min and then by a second step of allowing the test sample to stand still at room temperature for 10 min to complete one cycle. The first and second steps were conducted alternately to complete ten cycles. The test sample was judged in the same manner as that of the first antifogging test.

An abrasion resistance test was conducted in accordance with JIS L 3120-1961-1206 by moving a cotton canvas cloth on the test sample in a reciprocative manner under a load of 100 g/cm$^2$ at a rate of one reciprocation per second to complete 3,000 reciprocations. The test sample was judged to be satisfactory, when no noticeable scratches were found after the abrasion test, as shown by "Good" in the column of "external appearance" of Table 1. It was judged to be unsatisfactory, when noticeable scratches were found, as shown by "Not Good" in the column of "external appearance" of Table 1. Furthermore, the test sample was judged to be satisfactory when no fogging was observed even by blowing breath against the test sample after the abrasion test, as shown by "Good" in the column of "fogging" of Table 1. It was judged to be unsatisfactory when fogging was observed, as shown by "Not Good" in the column of "fogging" of Table 1.

A water resistance test was conducted by immersing the test sample in water of room temperature (20–25° C.) for 6 hr. The test sample was judged to be satisfactory when the external appearance of the test sample did not change after the water resistance test, as shown by "Good" in the column of "external appearance" of Table 1. It was judged to be unsatisfactory when the external appearance changed, as shown by "Not Good" in the column of "external appearance" of Table 1. Furthermore, the test sample was judged to be satisfactory when no fogging was observed on the test sample even by blowing breath against the test sample after the water resistance test, as shown by "Good" in the column of "fogging" of Table 1. It was judged to be unsatisfactory when fogging was observed, as shown by "Not Good" in the column of "fogging" of Table 1.

A wiping resistance test was conducted by wiping the test sample with a commercial, kitchen-use sponge moistened with water through 200 reciprocations of the sponge. It was judged in the same manner as that of the water resistance test.

An acid resistance test was conducted by immersing the test sample in 1 wt % HCl aqueous solution for 6 hr. It was judged in the same manner as that of the water resistance test.

EXAMPLE 2-1

At first, a polyvinyl acetal resin (degree of acetalization: 8 mol %; solid matter: 8%), KX-1 (trade name) of Sekisui Chemical Co., and an alkylsilylisocyanate coating agent, ORGATIX SIC-003 (trade name) of Matsumoto Seiyaku Co., were added to a solvent (i.e., a mixture of ethanol and water). This coating agent contained (1) methylsilyltriisocyanato in an amount of 10 wt % in terms of $SiO_2$ and (2) ethyl acetate as a solvent. The resulting mixture was stirred, thereby obtaining a first coating solution (solid matter concentration: 3 wt %). The amounts of the polyvinyl acetal resin and the alkylsilylisocyanate coating agent in the first coating solution were such that the weight ratio of the polyvinyl acetal resin to the hydrolysate or partial hydrolysate of alkylsilylisocyanate in the first film was 97.5:2.5.

Then, a glass plate (substrate) having one masked major surface was dipped in the first coating solution. Then, the coated glass plate was dried at about 120° C. for about 30 minutes, thereby forming a water-absorbing first film (thickness: 7.5 μm) on the substrate.

Separately, the above-mentioned alkylsilylisocyanate coating agent was added to ethyl acetate, thereby obtaining a second coating solution (solid matter concentration: 1 wt %).

Then, the second coating solution was applied to the first film by dipping while the uncoated side of the glass plate was masked, followed by drying at about 120° C. for about 30 minutes, thereby forming a moisture-permeable, protective, second film (thickness: 10 nm) on the first film.

EXAMPLE 2-2

Example 2-1 was repeated except that the amounts of the polyvinyl acetal resin and the alkylsilylisocyanate coating agent in the first coating solution were changed to adjust the weight ratio of the polyvinyl acetal resin to the hydrolysate or partial hydrolysate of alkylsilylisocyanate in the first film to 99:1. The resulting first film was 8 μm in thickness.

EXAMPLE 2-3

Example 2-1 was repeated except that the amounts of the polyvinyl acetal resin and the alkylsilylisocyanate coating

TABLE 1

| | 1st Antifogging Test | | 2nd Antifogging Test | | Abrasion Resistance Test | | Water Resistance Test | | Wiping Resistance Test | | Acid Resistance Test | |
|---|---|---|---|---|---|---|---|---|---|---|---|---|
| | External Appearance | Fogging | External Appearance | Fogging | External Appearance | Fogging | External Appearance | Fogging | External Appearance | Fogging | External Appearance | Fogging |
| Example 1-1 | Good | Good | Good | Good | Good | Good | Good | Good | Good | Good | Good | Good |
| Example 1-2 | Good | Good | Good | Good | Good | Good | Good | Good | Good | Good | Good | Good |
| Example 1-3 | Good | Good | Good | Good | Good | Good | Good | Good | Good | Good | Good | Good |
| Example 1-4 | Good | Good | Good | Good | Good | Good | Good | Good | Good | Good | Good | Good |
| Example 1-5 | Good | Good | Good | Good | Good | Good | Good | Good | Good | Good | Good | Good |
| Example 1-6 | Good | Good | Good | Good | Good | Good | Good | Good | Good | Good | Good | Good |
| Example 1-7 | Good | Good | Good | Good | Good | Good | Good | Good | Good | Good | Good | Good |
| Example 1-8 | Good | Good | Good | Good | Good | Good | Good | Good | Good | Good | Good | Good |
| Example 1-9 | Good | Good | Good | Good | Good | Good | Good | Good | Good | Good | Good | Good |
| Example 1-10 | Good | Good | Good | Good | Good | Good | Good | Good | Good | Good | Good | Good |
| Com. Ex. 1-1 | Good | Good | Good | Good | Not Good | Not Good | Not Good | Not Good | Not Good | Not Good | Not Good | Not Good |
| Com. Ex. 1-2 | Good | Not Good | Good | Not Good | Not Good | Not Good | Good | Not Good | Good | Not Good | Good | Not Good |
| Com. Ex. 1-3 | Good | Not Good | Good | Not Good | Not Good | Not Good | Good | Not Good | Good | Not Good | Good | Not Good |
| Com. Ex. 1-4 | Good | Good | Good | Good | Not Good | Not Good | Not Good | Not Good | Not Good | Not Good | Not Good | Not Good | agent in the first coating solution were changed to adjust the weight ratio of the polyvinyl acetal resin to the hydrolysate or partial hydrolysate of alkylsilylisocyanate in the first film to 95:5. The resulting first film was 7 μm in thickness.

EXAMPLE 2-4

Example 2-1 was repeated except that the second film was adjusted to have a thickness of 4 nm. The first film was 7 μm in thickness.

COMPARATIVE EXAMPLE 2-1

Example 2-1 was repeated except that the use of the alkylsilylisocyanate coating agent was omitted. The resulting first film was 7 μm in thickness. Numerous scratches were found on the test sample after 300 reciprocations of the after-mentioned abrasion resistance test (see Table 2). The first and/or second film exfoliated from the substrate after 10 times of the wiping of the after-mentioned wiping test.

COMPARATIVE EXAMPLE 2-2

Example 2-1 was repeated except that the second film was adjusted to have a thickness of 2 nm. The first film was 7 μm in thickness. Numerous scratches were found on the test sample after 600 reciprocations of the abrasion resistance test (see Table 2). The first and/or second film exfoliated from the substrate after 30 times of the wiping of the wiping test.

COMPARATIVE EXAMPLE 2-3

Example 2-1 was repeated except that the second film was adjusted to have a thickness of 20 nm. The first film was 7 μm in thickness. Fogging was observed by blowing breath against the test sample.

COMPARATIVE EXAMPLE 2-4

Example 2-1 was repeated except that a polyvinyl acetal resin (degree of acetalization: not less than 70 mol %), ESREK KS-5 (trade name) of Sekisui Chemical Co. was used in place of KX-1. The resulting first film was 6 μm in thickness. Fogging was observed by blowing breath against the test sample.

COMPARATIVE EXAMPLE 2-5

Example 2-1 was repeated except that a polyvinyl alcohol resin was used in place of the polyvinyl acetal resin. The resulting first film was about 6 μm in thickness. The first and/or second film exfoliated from the substrate after 20 times of the wiping of the wiping test. Fogging was observed even by allowing the test sample to stand still for at least one day after the after-mentioned water resistance test.

COMPARATIVE EXAMPLE 2-6

Example 2-1 was repeated except that the formation of the second film was omitted. The first film was 7 μm in thickness. Numerous scratches were found after 300 reciprocations of the abrasion resistance test. The first and/or second film exfoliated from the substrate after 20 times of the wiping of the wiping test.

EXAMPLE 3-1

At first, a polyvinyl acetal resin (degree of acetalization: 8 mol %; solid matter: 8%), KX-1 (trade name) of Sekisui Chemical Co., and a silylisocyanate, ORGATIX SI-400 (trade name) of Matsumoto Seiyaku Co., in which solid matter is 100%, were added to a solvent (i.e., a mixture of ethanol and water). The resulting mixture was stirred, thereby obtaining a first coating solution (solid matter concentration: 3 wt %). The amounts of the polyvinyl acetal resin and the silylisocyanate in the first coating solution were such that the weight ratio of the polyvinyl acetal resin to the silylisocyanate in the first film was 98.5:1.5.

Then, the same steps as those of Example 2-1 were conducted, thereby forming a water-absorbing first film (thickness: 9.5 μm) on the substrate.

Separately, an aluminum-based curing catalyst was added to a water-repellent coating agent, that is, a mixture of hexamethyldisilazane and dimethyl silicone, KPN-3504 (trade name) of Shin-Etsu Chemical Co., Ltd. in which solid matter is 100%, thereby obtaining a second coating solution.

Then, the same steps as those of Example 2-1 were conducted, thereby forming a moisture-permeable, protective, second film (thickness: 10 nm) on the first film.

EXAMPLE 3-2

Example 3-1 was repeated except that the amounts of the polyvinyl acetal resin and the silylisocyanate in the first coating solution were changed to adjust the weight ratio of the polyvinyl acetal resin to the silylisocyanate in the first film to 99.5:0.5. The resulting first film was 8 μm in thickness.

EXAMPLE 3-3

Example 3-1 was repeated except that the amounts of the polyvinyl acetal resin and the silylisocyanate in the first coating solution were changed to adjust the weight ratio of the polyvinyl acetal resin to the silylisocyanate in the first film to 95:5. The resulting first film was 13 μm in thickness.

EXAMPLE 3-4

Example 3-1 was repeated except that a methylsilyltri-isocyanate coating agent, SIC-003 (trade name) of Matsumoto Seiyaku Co., was used for preparing the second film. The first film was 11 μm in thickness.

EXAMPLE 3-5

Example 3-1 was repeated except that a dimethyl silicone coating agent, KF-9901 (trade name) of Shin-Etsu Chemical Co., Ltd. was used for preparing the second film. The first film was 12 μm in thickness.

COMPARATIVE EXAMPLE 3-1

Example 3-1 was repeated except that the use of the silylisocyanate was omitted. The resulting first film was 7 μm in thickness. Numerous scratches were found on the test sample after 300 reciprocations of the after-mentioned abrasion resistance test (see Table 3). The first and/or second film exfoliated from the substrate after 10 times of the wiping of the after-mentioned wiping test.

COMPARATIVE EXAMPLE 3-2

Example 3-1 was repeated except that the second film was adjusted to have a thickness of 2 nm. The first film was 7 μm in thickness. Numerous scratches were found on the test sample after 600 reciprocations of the abrasion resistance test (see Table 2). The first and/or second film exfoliated from the substrate after 30 times of the wiping of the wiping test.

COMPARATIVE EXAMPLE 3-3

Example 3-1 was repeated except that the second film was adjusted to have a thickness of 20 nm. The first film was 7 µm in thickness. Fogging was observed by blowing breath against the test sample.

COMPARATIVE EXAMPLE 3-4

Example 3-1 was repeated except that a polyvinyl acetal resin (degree of acetalization: not less than 70 mol %), ESREK KS-5 (trade name) of Sekisui Chemical Co. was used in place of KX-1. The resulting first film was 6 µm in thickness. Fogging was observed by blowing breath against the test sample.

COMPARATIVE EXAMPLE 3-5

Example 3-1 was repeated except that a polyvinyl alcohol resin was used in place of the polyvinyl acetal resin. The resulting first film was about 6 µm in thickness. The first and/or second film exfoliated from the substrate after 20 times of the wiping of the wiping test. Fogging was observed even by allowing the test sample to stand still for at least one day after the after-mentioned water resistance test.

COMPARATIVE EXAMPLE 3-6

Example 3-1 was repeated except that the formation of the second film was omitted. The first film was 7 µm in thickness. Numerous scratches were found after 300 reciprocations of the abrasion resistance test. The first and/or second film exfoliated from the substrate after 20 times of the wiping of the wiping test.

SECOND EVALUATION TEST

The resulting test samples (the coated substrates) of Examples 2-1 to 2-4, Comparative Examples 2-1 to 2-6, Examples 3-1 to 3-5, and Comparative Examples 3-1 to 3-6 were subjected to the following evaluation tests.

The first antifogging test of First Evaluation Test was repeated. The second antifogging test of First Evaluation Test was repeated except that the second step was conducted by moving the test sample from the refrigerator to an atmosphere of 23° C. and a relative humidity of 63%.

The water resistance test of First Evaluation Test was repeated except that the test sample was immersed in water of room temperature (21–25° C.).

A wiping resistance test was conducted by wetting a cloth, then squeezing the excess water from the cloth, then wiping the test sample with the cloth fifty times in total. After each ten times of the wiping, breath was blown against the test sample. The test sample was judged to be satisfactory when no fogging was observed on the test sample even by blowing breath after fifty times of the wiping, as shown by "Good" in the column of "fogging" of Table 2. On the other hand, it was judged to be unsatisfactory when fogging was observed during the test, as shown by "Not Good" in the column of "fogging" of Table 2.

The abrasion resistance test of First Evaluation Test was repeated except that the external appearance of the test sample and the existence of fogging on the test sample were checked after each 300 reciprocations of the canvas cloth. The test sample was judged to be satisfactory, when no abnormality of the test sample was found even after 3,000 reciprocations, as shown by "Good" in the column of "external appearance" of Table 2. It was judged to be unsatisfactory, when abnormality of the test sample was found, as shown by "Not Good" in the column of "external appearance" of Table 2. Furthermore, the test sample was judged to be satisfactory when no fogging was observed even by blowing breath against the test sample even after 3,000 reciprocations, as shown by "Good" in the column of "fogging" of Table 2. It was judged to be unsatisfactory when fogging was observed, as shown by "Not Good" in the column of "fogging" of Table 2.

TABLE 2

|  | 1st Antifogging Test | | 2nd Antifogging Test | | Water Resistance Test | | Wiping Resistance Test | | Abrasion Resistance Test | |
| --- | --- | --- | --- | --- | --- | --- | --- | --- | --- | --- |
|  | External Appearance | Fogging | External Appearance | Fogging | External Appearance | Fogging | External Appearance | Fogging | External Appearance | Fogging |
| Example 2-1 | Good | Good | Good | Good | Good | Good | Good | Good | Good | Good |
| Example 2-2 | Good | Good | Good | Good | Good | Good | Good | Good | Good | Good |
| Example 2-3 | Good | Good | Good | Good | Good | Good | Good | Good | Good | Good |
| Example 2-4 | Good | Good | Good | Good | Good | Good | Good | Good | Good | Good |
| Com. Ex. 2-1 | Good | Good | Good | Good | Good | Good | Not Good | Not Good | Not Good | Good |
| Com. Ex. 2-2 | Good | Good | Good | Good | Good | Good | Not Good | Not Good | Not Good | Good |
| Com. Ex. 2-3 | Good | Not Good | Good | Not Good | Good | Not Good | Good | Not Good | Good | Not Good |
| Com. Ex. 2-4 | Good | Not Good | Good | Not Good | Good | Not Good | Good | Not Good | Good | Not Good |
| Com. Ex. 2-5 | Good | Good | Good | Good | Good | Not Good | Not Good | Not Good | Good | Good |
| Com. Ex. 2-6 | Good | Good | Good | Good | Good | Good | Not Good | Not Good | Not Good | Good |

TABLE 3

| | 1st Antifogging Test | | 2nd Antifogging Test | | Water Resistance Test | | Wiping Resistance Test | | Abrasion Resistance Test | |
|---|---|---|---|---|---|---|---|---|---|---|
| | External Appearance | Fogging | External Appearance | Fogging | External Appearance | Fogging | External Appearance | Fogging | External Appearance | Fogging |
| Example 3-1 | Good | Good | Good | Good | Good | Good | Good | Good | Good | Good |
| Example 3-2 | Good | Good | Good | Good | Good | Good | Good | Good | Good | Good |
| Example 3-3 | Good | Good | Good | Good | Good | Good | Good | Good | Good | Good |
| Example 3-4 | Good | Good | Good | Good | Good | Good | Good | Good | Good | Good |
| Example 3-5 | Good | Good | Good | Good | Good | Good | Good | Good | Good | Good |
| Com. Ex. 3-1 | Good | Good | Good | Good | Good | Good | Not Good | Not Good | Not Good | Good |
| Com. Ex. 3-2 | Good | Good | Good | Good | Good | Good | Not Good | Not Good | Not Good | Good |
| Com. Ex. 3-3 | Good | Not Good | Good | Not Good | Good | Not Good | Good | Not Good | Good | Not Good |
| Com. Ex. 3-4 | Good | Not Good | Good | Not Good | Good | Not Good | Good | Not Good | Good | Not Good |
| Com. Ex. 3-5 | Good | Good | Good | Good | Good | Not Good | Not Good | Not Good | Good | Good |
| Com. Ex. 3-6 | Good | Good | Good | Good | Good | Good | Not Good | Not Good | Not Good | Good |

The entire disclosure of Japanese Patent Application No. 11-329527 filed on Nov. 19, 1999, No. 11-335334 filed on Nov. 26, 1999, and No. 2000-114517 filed on Apr. 17, 2000, including specification, claims and summary, is incorporated herein by reference in its entirety.

What is claimed is:

1. An antifogging article comprising:
    a substrate;
    a water-absorbing, antifogging film covering said substrate, said antifogging film comprising:
    (a) an acetalized polyvinyl alcohol resin having a degree of acetalization of not greater than 10 mol %; and
    (b) a constituent that is at least one of a silylisocyanate, a hydrolysate of said silylisocyanate, and a partial condensate of said silylisocyanate, said silylisocyanate being represented by the formula $Si(NCO)_4$; and
    a water-permeable, protective film covering said antifogging film.

2. An antifogging article according to claim 1, wherein said protective film has a thickness of 3–10 nm.

3. An antifogging article according to claim 1, wherein said antifogging film comprises 95.0–99.5 wt % of said acetalized polyvinyl alcohol resin and 0.5–5.0 wt % of said constituent.

4. An antifogging article according to claim 1, wherein said protective film comprises a water-repellent silicon compound.

5. An antifogging article prepared by a process comprising:
    (a) providing a substrate;
    (b) preparing a first coating liquid by adding an acetalized polyvinyl alcohol resin and a constituent to a solvent, said acetalized polyvinyl alcohol resin having a degree of acetalization of not greater than 10 mol %, said constituent being at least one of a silylisocyanate, a hydrolysate of said silylisocyanate, and a partial condensate of said silylisocyanate, said silylisocyanate being represented by the formula $Si(NCO)_4$;
    (c) applying said first coating liquid to said substrate, thereby forming a first precursory film on said substrate;
    (d) drying said first precursory film into a water-absorbing, antifogging film;
    (e) applying a second coating liquid containing a water-repellent silicon compound to said antifogging film, thereby forming a second precursory film on said antifogging film; and
    (f) drying said second precursory film into a water-permeable, protective film.

6. An antifogging article according to claim 5, wherein said first precursory film is dried at a first temperature of 90–150° C.

7. An antifogging article according to claim 5, wherein said second precursory film is dried at a second temperature of 90–150° C.

8. An antifogging article according to claim 5, wherein said solvent is a mixture of water and an at least one compound selected from the group consisting of alcohols, esters and cellosolves.

9. A process for producing an antifogging article, comprising:
    (a) providing a substrate;
    (b) preparing a first coating liquid by adding an acetalized polyvinyl alcohol resin and a constituent to a solvent, said acetalized polyvinyl alcohol resin having a degree of acetalization of not greater than 10 mol %, said constituent being at least one of a silylisocyanate, a hydrolysate of said silylisocyanate, and a partial condensate of said silylisocyanate, said silylisocyanate being represented by the formula $Si(NCO)_4$;
    (c) applying said first coating liquid to said substrate, thereby forming a first precursory film on said substrate;
    (d) drying said first precursory film into a water-absorbing, antifogging film;
    (e) applying a second coating liquid containing a water-repellent silicon compound to said antifogging film, thereby forming a second precursory film on said antifogging film; and
    (f) drying said second precursory film into a water-permeable, protective film.

10. A process according to claim 9, wherein said first precursory film is dried at a first temperature of 90–150° C.

11. A process according to claim 9, wherein said second precursory film is dried at a second temperature of 90–150° C.

12. A process according to claim 9, wherein said solvent is a mixture of water and an at least one compound selected from the group consisting of alcohols, esters and cellosolves.

* * * * *